(No Model.)
S. DARLING.
KEY SEAT RULE.
No. 470,864.          Patented Mar. 15, 1892.
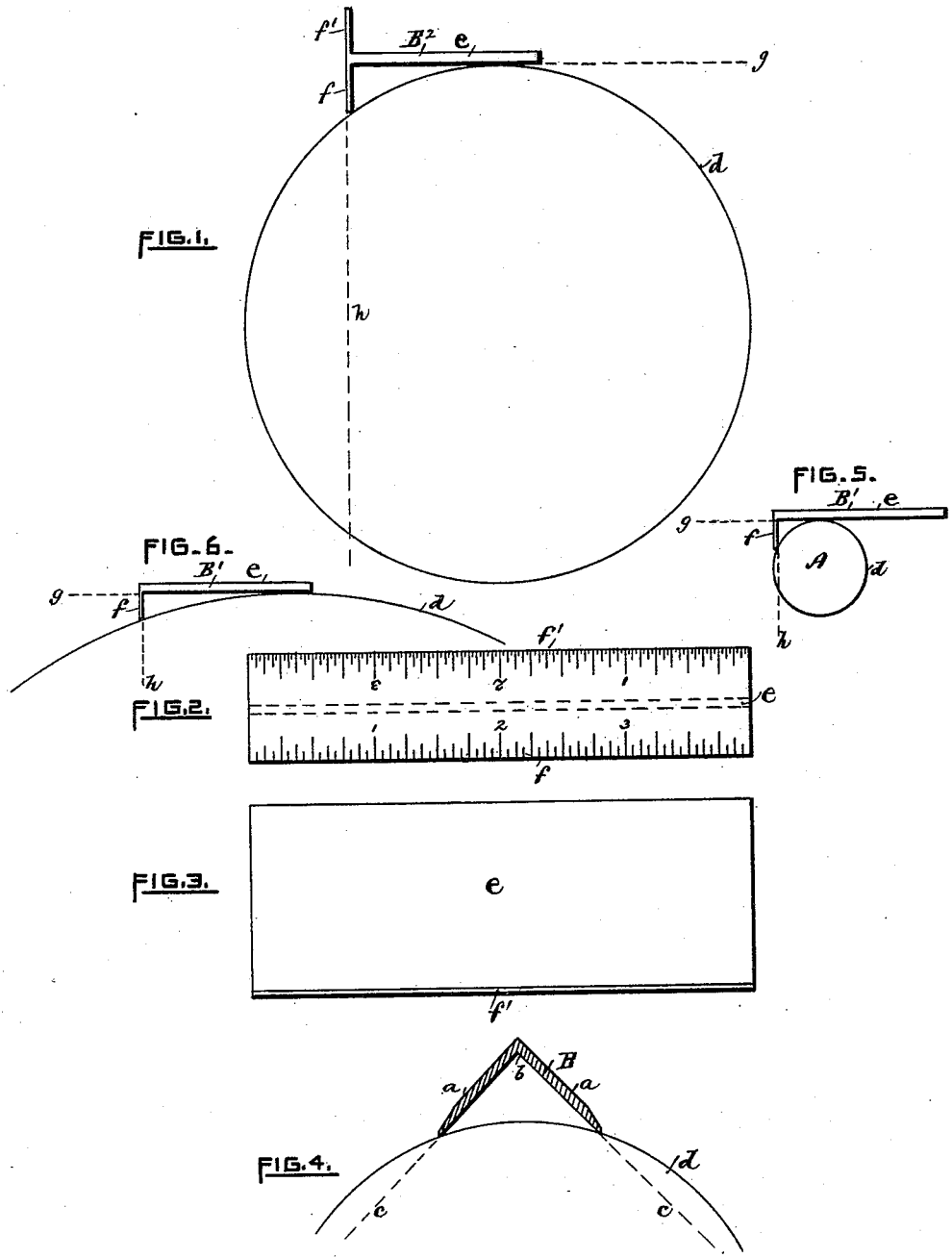

UNITED STATES PATENT OFFICE.

SAMUEL DARLING, OF PROVIDENCE, RHODE ISLAND.

KEY-SEAT RULE.

SPECIFICATION forming part of Letters Patent No. 470,864, dated March 15, 1892.

Application filed January 9, 1891. Serial No. 377,264. (No model.)

*To all whom it may concern:*

Be it known that I, SAMUEL DARLING, a citizen of the United States, residing at Providence, in the State of Rhode Island, have invented a new and useful Improvement in Key-Seat Rules, of which the following is a specification.

Key-seat rules of the ordinary construction are liable to a certain degree of variation from the proper line when applied to the periphery of a shaft of comparatively large diameter, and require care in their proper adjustment; and it is the object of my invention to provide an instrument adapted for greater rapidity and accuracy in its adjustment to the shaft; and to this end my invention consists in a key-seat rule having its bearing sides of unequal width, whereby upon the application of the rule to the periphery of a shaft one of the said sides will lie in the plane of a tangent and the other in the plane of a chord to the circumference of the shaft.

It also consists in a key-seat rule having a T-formed cross-section, whereby the opposite portion of the cross-plate may be employed as a convenient handle when applying the instrument to the shaft.

Figure 1 represents an end view of the improved key-seat rule made in T form and applied to the periphery of a shaft. Fig. 2 represents a face view of the rule shown in Fig. 1. Fig. 3 represents a plan view of the wide side of the rule. Fig. 4 represents an end view of the key-seat rule of ordinary construction applied to the periphery of a shaft of the diameter shown in Fig. 1. Fig. 5 represents the improved key-seat rule as applied to the periphery of a shaft of small diameter. Fig. 6 represents the same instrument as applied to a shaft of a diameter about ten times as great as that shown in Fig. 5.

In the accompanying drawings, Fig. 4, $d$ represents a portion of the circumference of the shaft, and B a key-seat rule of the ordinary construction in which the sides $a$ $a$ are made of equal width from the angular point $b$, so that when applied to the shaft the said sides will lie in the plane of the equal chords $c$ $c$ of the circumference $d$; but in my improvement I make the sides $e$ and $f$ of the rule B' of unequal width, as shown in Fig. 5, so that the wide side $e$ will, when applied to the periphery of the shaft, lie in the plane of the tangent $g$, while the narrow side $f$ will lie in the plane of the chord $h$ of the circumference $d$, and the wide side $e$ will, by resting squarely against the side of the shaft, form a positive means for the accurate adjustment of the rule in one direction, while the contact of the edge of the narrow side $f$ with the periphery of the shaft will serve to instantly adjust the rule correctly in the other direction. The narrow side $f$ is graduated upon its face into inches and fractions of an inch, as in usual in key-seat rules, and an opposite narrow side $f'$ (see Fig. 1) is preferably provided at the opposite side of the rule $B^2$, so that the rule will be reversible, and in this case the graduations upon the side $f'$ may be made different from those upon the opposite side $f$, if desired, and when one of the said narrow sides is being used as a guide to mark the line of a key-seat upon the periphery of the shaft the opposite narrow side can be employed as a convenient handle for the instrument.

My improved key-seat rule is not only more ready and accurate in its adjustment to the shaft than the rule heretofore employed, but has a much greater range of adaptability to shafts of extreme sizes, as will be seen by reference to Figs. 5 and 6, Fig. 5 showing the application of the rule B to a shaft A of small diameter and Fig. 6 the application of the same rule to the periphery $d$ of a shaft of about ten times the diameter of the shaft shown in Fig. 5, the rule being in this case shown in its simpler form as having but one short side; but the T form shown in Fig. 1 is deemed preferable in practice.

I am aware of United States Patent No. 22,585 and of United States Patent No. 387,966, in which irregular plates have a flange on one straight edge, and I do not broadly claim a plate or rule having a flange on one edge.

The essential features of my invention are the broad plate or side having straight edges, with a narrow side or flange set at an angle to the wide side and having its straight edge substantially parallel with the edge of the wide side.

I claim as my invention—

A key-seat rule having a wide side with substantially straight and parallel edges and a narrow side set on one edge of the wide side at an angle thereto and substantially parallel with those of the wide side, whereby one side is tangential and the edge of the other side rests on the periphery, substantially as set forth.

SAML. DARLING.

Witnesses:
 JOHN S. LYNCH,
 SOCRATES SCHOLFIELD.